United States Patent
Berens et al.

(10) Patent No.: US 9,410,580 B2
(45) Date of Patent: Aug. 9, 2016

(54) MECHANICAL SYSTEM EQUIPPED WITH ACTIVE MICROCAPSULES FOR CONDITION MONITORING

(71) Applicants: Frank Berens, Saunay (FR); Laurent Varnoux, Saint Avertin (FR); Olivier Verbe, Tours (FR)

(72) Inventors: Frank Berens, Saunay (FR); Laurent Varnoux, Saint Avertin (FR); Olivier Verbe, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/703,005

(22) Filed: May 4, 2015

(65) Prior Publication Data
US 2015/0323010 A1      Nov. 12, 2015

(30) Foreign Application Priority Data

May 6, 2014   (FR) ..................................... 14 01031

(51) Int. Cl.
| | |
|---|---|
| F16C 33/66 | (2006.01) |
| F16C 41/00 | (2006.01) |
| C10M 109/00 | (2006.01) |
| F16C 19/52 | (2006.01) |
| F16C 33/10 | (2006.01) |
| F01M 9/02 | (2006.01) |
| F16C 19/06 | (2006.01) |

(52) U.S. Cl.
CPC .......... *F16C 33/6688* (2013.01); *C10M 109/00* (2013.01); *F16C 19/52* (2013.01); *F16C 19/525* (2013.01); *F16C 33/109* (2013.01); *F16C 33/1045* (2013.01); *F16C 33/6659* (2013.01); *F16C 33/6696* (2013.01); *F16C 41/008* (2013.01); *C10N 2250/16* (2013.01); *F01M 9/02* (2013.01); *F16C 19/06* (2013.01); *F16C 2233/00* (2013.01)

(58) Field of Classification Search
CPC .......................... F16C 33/6633; F16C 33/6688
See application file for complete search history.

(56) References Cited

FOREIGN PATENT DOCUMENTS

| | | |
|---|---|---|
| JP | 2005036212 A | 2/2005 |
| JP | 2006009837 A | 1/2006 |
| JP | 2006064059 A | 3/2006 |
| JP | 2008094975 A | 4/2008 |
| WO | 2006065695 A2 | 6/2006 |

*Primary Examiner* — Thomas R. Hannon
(74) *Attorney, Agent, or Firm* — Bryan Peckjian; SKF USA Inc. Patent Dept.

(57) ABSTRACT

A mechanical system comprising at least one moving component and a lubricant. The mechanical system also comprises a plurality of at least one type of microcapsule consisting of a shell, which, under the effect of a variation of a given characteristic physical parameter of the mechanical system, is capable of releasing particles. The dispersion of the particles is identifiable by a system located external to the mechanical system.

10 Claims, 1 Drawing Sheet

MECHANICAL SYSTEM EQUIPPED WITH ACTIVE MICROCAPSULES FOR CONDITION MONITORING

CROSS REFERENCE TO RELATED APPLICATIONS

This is a Non-Provisional Patent Application, filed under the Paris Convention, claims the benefit of France Patent (FR) Application Number 1401031 filed on 6 May 2014 (06.05.2014), which is incorporated herein by reference in its entirety.

FIELD OF THE INVENTION

The present invention concerns the field of mechanical systems with moving components, bearings for example, and for all types of applications requiring such systems, such as motorized vehicles, internal combustion engines, electric motors, and torque transmission elements, etc.

PRIOR ART

The service life of a mechanical system with moving components is essentially associated with the lubrication of the components. Faulty lubrication generally results in rapid deterioration and the failure of the components, and thus the system. Mechanical systems habitually comprise surfaces in mechanical contact which can be lubricated by a lubricant, grease or oil for example, initially placed inside the mechanical system. However, over time, the mixing of the lubricant combined with its aging and the heating cycles to which the components are subjected, causes the grease to deteriorate. Periodic maintenance operations may be considered, involving re-greasing or replacement of at least one component of the mechanical system.

However, these maintenance operations must sometimes be anticipated in the event of abnormal deterioration or failure of a component of the mechanical system or its lubrication. It is thus necessary to monitor the condition of the mechanical system while it is in operation, otherwise known as "condition monitoring".

Generally speaking, a process is known in which the mechanical system is equipped with sensors to measure and monitor physical parameters of the mechanical system and/or its environment in order to report, as the case may be, the detection of abnormal variations of said parameters resulting from abnormal deterioration or failure of a system component.

However, such condition monitoring means are additional system means whose integration must be foreseen without interfering with the normal action of the mechanical system's components. Means for communicating, analyzing and/or visualizing data transmitted by the condition monitoring means must also be foreseen which, in the case of a sensor, are electronic equipment. All these elements represent additional system costs, for which condition monitoring is complex to implement.

The invention more specifically intends to address these problems by proposing a mechanical system with condition monitoring means that are simple to produce and install, with a reduced number of elements, ensuring efficient condition monitoring.

OBJECT AND BRIEF SUMMARY OF THE INVENTION

In relation thereto, the invention concerns a mechanical system comprising at least one moving component and lubricant.

In accordance with the invention, the mechanical system also comprises microcapsules forming a shell which, due to changes in a given characteristic physical parameter of the mechanical system, is capable of releasing particles, the dispersion of which is identifiable by means external to the mechanical system. The mechanical system comprises a plurality of microcapsule types, each type of microcapsule being sensitive to the variation of a different physical parameter that is specific to the mechanical system, thus enabling the release of particles for the variations of different parameters.

Owing to the invention, by adapting the shell of the microcapsules to the physical parameter for which the variation is to be detected, and by adapting the particles to the type of identification desired, it is possible to monitor the condition of the mechanical system in relation to a given physical parameter. The parameterization of the shell in relation to a threshold value of a variation of said physical parameter thus enables the release of particles at this value, for example a value signifying a failure.

As these released particles are identifiable by a means external to the mechanical system, it can thus be possible to detect the appearance of a system failure in real time, during operation, without having to wait for a possible maintenance operation.

It is also possible to monitor changes of a parameter of the system over time and thus evaluate the extent of wear or efficiency during system operation, thereby enabling a possible maintenance operation to be anticipated or postponed.

Owing to the invention, it is possible to know the cause of a failure by the type of particles released into the system.

The microcapsules are incorporated into the system and require neither adaptation of the internal components of said system nor additional installation space. The microcapsules do not influence the operation of the components.

Furthermore, the type of microcapsule incorporated into the mechanical system can be adapted according to the application, conditions, materials, functions and components making up said system.

The technical effect is to monitor, in parallel, the change of a plurality of parameters in an independent manner while the mechanical system is in operation.

According to advantageous but not mandatory aspects of the invention, such a mechanical system may incorporate one or more of the following features, considered in all technically allowable combinations:

- The mechanical system is a bearing comprising a first ring, a second ring, said rings being rotatably mobile in relation to one another, at least one row of rolling elements between the two rings and lubricant in a bearing chamber defined between the two rings.
- The microcapsules are mixed in with the lubricant of the mechanical system.
- The microcapsules are deposited in a layer on the surface of at least part of an internal component of the mechanical system, for example in a surface treatment protecting the components from oxidation.
- The microcapsules are incorporated into the material making up at least one internal component of the mechanical system.
- The microcapsules are incorporated into an overmolding of a polymer or synthetic part of at least one internal component of the mechanical system.
- The microcapsules are between 1 nm (nanometer) and 10 µm (micrometer) in size.
- The shell of a microcapsule consists of a solid external layer embedded with the particles. As a result of a variation in a given physical parameter of the mechanical system, the shell breaks and releases the particles.

The shell of a microcapsule consists of a porous element provided with cavities wherein the particles are incorporated. As a result of a variation of a given physical parameter of the mechanical system, the structure of the shell transforms, by breaking, cracking, dissolving, etc., for example, and releases the particles.

By means of non-limiting example, the characteristic physical parameter of the mechanical system is mechanical in nature, such as the speed of movement of a component, the temperature, the pressure, and vibration.

By means of non-limiting example, the characteristic physical parameter of the mechanical system is chemical in nature, such as acidity, viscosity and level of oxidation.

The mechanical system comprises a type of microcapsule that is sensitive to a single type of physical parameter of the mechanical system, but the microcapsules of which are each sensitive to a different value of said parameter, thus enabling particles to be released at different values.

The shell of the microcapsules is sensitive to the variation of a physical parameter of the mechanical system and is comprised of a polymer, synthetic or organic material capable of reacting to a variation of said parameter.

The microcapsules of a different type, i.e. the shells of which are sensitive to different parameters and/or different threshold values, each comprise particles of different types.

The identification means external to the mechanical system is direct, i.e. the identification of the release of the particles from the microcapsules into the mechanical system can be determined by one of the operator's senses.

The identification means external to the mechanical system is indirect, i.e. the identification of the release of the particles from the microcapsules into the mechanical system requires an additional sensor.

The particles of the microcapsules are electrically charged and, once released into the mechanical system, change the electric potential of the system, at least locally. For example, the identification means external to the mechanical system can consist of an electric potential sensor.

The particles of the microcapsules are chemical reagents capable of reacting with one of the constituent elements of the mechanical system. New chemical species may result from chemical reactions between said element of the mechanical system and the released particles. For example, the identification means external to the mechanical system can consist of a sensor of one of said new chemical species. The new chemical species may also have an influence on the mechanical (temperature, pressure, etc.) or chemical (acidity, viscosity, etc.) parameters of the system; the identification means external to the mechanical system can thus consist of a sensor of said influenced parameter.

The particles of the microcapsules are coloring agents. The identification means external to the mechanical system consists in an operator viewing a change in color of the mechanical system, at least locally.

BRIEF DESCRIPTION OF THE DRAWINGS

The invention will be better understood and other advantages thereof will become more apparent upon reading the following description of an embodiment presenting a mechanical system consisting of a bearing according to its principle, given solely for example and with reference to the accompanying non-limiting drawings, wherein.

DETAILED DESCRIPTION OF PARTICULAR EMBODIMENTS

Figure 1:
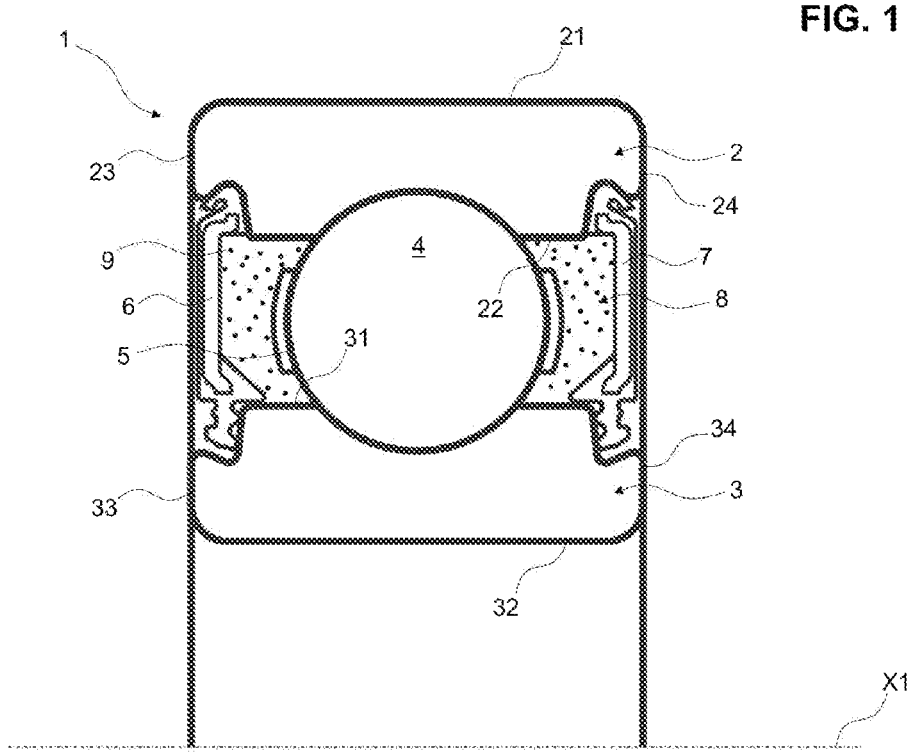
FIG. 1 represents a sectional view of a bearing.

A bearing 1 with central axis X1 comprises an outer ring 2, an inner ring 3, a row of rolling elements 4, here balls, arranged in parallel planes held by a cage 5, and two seals 6 and 7, respectively.

The rings 2, 3 are coaxial with the central axis X1 in the normal operating mode.

The outer ring 2 comprises an outer cylindrical surface 21, a bore 22 wherein a raceway is formed for the rolling elements 4 and the grooves wherein are fitted the seals 6 and said seals form a static seal with the rotating outer ring 2.

The inner ring 3 comprises an outer cylindrical surface 31 wherein is formed a raceway for the rolling elements 4 and grooves for making contact seals with the seals 6 and 7, said seal forming a dynamic seal with the non-rotating inner ring 3.

Alternatively, the inner ring 3 may be rotating and the outer race 2 non-rotating, or both rings can be rotating relative to each other.

The outer ring 2 is defined axially by two frontal radial edges 23 and 24 and the inner ring 3 is defined axially by two frontal radial edges 33 and 34 such that said edges are axially aligned, respectively.

The inner race 3 also comprises a cylindrical bore 32 therethrough. For example, a pin or a support can be inserted into said bore 32.

The cylindrical outer surface 31 of the inner ring 3, the bore 22 of the inner ring 2 and the seals 6, 7 define a bearing chamber 8 wherein the rolling elements 4 are in motion between the rings 2, 3. The bearing chamber 8 is filled with lubricant, e.g. grease or oil, to reduce friction between the contact surfaces of moving components, here the rolling elements 4, the raceway provided at the cylindrical outer surface 31 and the raceway provided at the bore 22 of the inner ring 2.

According to the invention, the lubricant in the bearing chamber 8 comprises a plurality of microcapsules 9.

According to an embodiment not shown, the microcapsules 9 may be deposited by a layer on the surface of at least a part of an element in the bearing chamber 8 of the bearing 1, for example on the cylindrical outer surface 31 of the inner ring 3 of the bore 22 of the inner ring 2, on the inner surface of the seals 6, 7, on the outer surface of the cage 5 and/or on the outer surface of the rolling elements 4. Alternatively, the microcapsules may be incorporated in the material constituting at least one element of the bearing 3, for example in the inner ring 3, in the outer ring 2, in the cage 5 and/or in the seals 6, 7. This integration can be done through overmolding.

Figure 2:
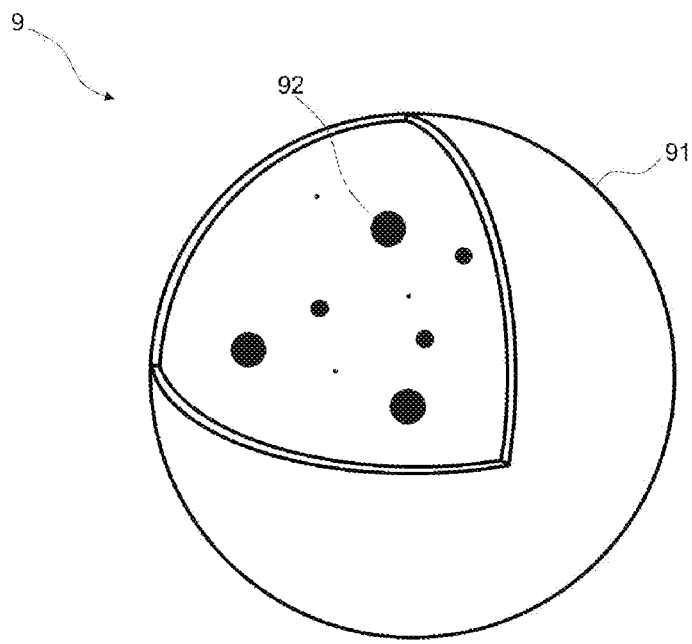
FIG. 2 represents a microcapsule.

As shown in FIG. 2, a microcapsule comprises a shell 91 consisting of a solid outer layer composed of plastic, polymer or organic material and is between 1 nm and 1 μm in size. The shell 91 comprises at least one, but more generally a plurality of particles 92 therein.

The shell 91 of the microcapsules 9 is sensitive to a physical variation of the bearing 1, being capable of reacting to a variation of said parameter. By means of non-limiting example, this parameter can be mechanical, such as the relative speed of rotation of rings 2 and 3, the temperature, pressure, vibration, or of chemical type, by means of non-limiting example, the humidity, acidity, viscosity, and the level of oxidation of a material constituting an element of the bearing 1 or the lubricant in the bearing chamber 8. The choice of the parameter to be monitored is determined by the type of application, the environment, constraints, and the identified risks of the bearing 1. It is possible to provide the bearing 1 with several types of microcapsules, each type being sensitive to a different parameter.

The choice of material and the dimensions constituting the shell 91 of a microcapsule are defined as a function of a threshold value of a parameter of the bearing such that the shell 91 breaks in the event this threshold value is exceeded by said parameter. The particles 92 are then released into the lubricant, in the bearing chamber 8 of the bearing 1. It is possible to provide the bearing 1 with several types of microcapsules, all being sensitive to the same parameter, but for different threshold values. It is thus possible to combine different types of microcapsules with different threshold values for each parameter.

The particles 92 released by the microcapsules 9 may be of different types, depending on the identification means made available and/or desired.

According to one embodiment, the particles 92 may be chemical reagents capable of reacting with one of the components of the lubricant, one of the materials of the constituent elements of the bearing 1, or new chemical species that may result from chemical reactions with the released particles. In this case, a means for identifying the presence of the particles may consist of a sensor of one of said new chemical species.

The new chemical species may also have an influence on the mechanical (temperature, pressure, etc.) or chemical (acidity, viscosity, etc.) parameters of the bearing; the identification means can thus consist of a sensor of said influenced parameter.

According to another embodiment, the particles 92 of the microcapsules 9 may be coloring agents. The identification means thus consists of the operator observing a color change of the lubricant and/or the bearing, at least locally.

In the case where the bearing 1 comprises particles 92 consisting of different coloring agents, in shells 91 sensitive to physical and/or threshold values of said various parameters, the release of one or more types of coloring agents allows the parameters and/or levels of variation of said parameters to be determined solely by means of the color of the lubricant and/or bearing, at least locally. The identification can thus be made using a previously established color chart.

In one example to illustrate this, the lubricant in the bearing chamber 8 may comprise a first type of microcapsule 9, the shells 91 of which are sensitive to the temperature variation of the bearing 1 and a second type of microcapsule 9, the shells 91 of which are sensitive to the variation of acidity of the lubricant of said bearing 1. The first type of microcapsule 9 may include particles 92 which are yellow agents while the second type may include particles 92 which are blue agents.

In the case where only the temperature rises above a predetermined threshold value, the shells 91 of the temperature sensitive microcapsules 9 release the yellow particles 92. An external operator can thus directly observe the color change. Similarly, if only the acidity of the lubricant increases beyond a threshold value, the operator observes a color change to blue.

However, if the threshold values are exceeded for both the temperature and the acidity, the yellow and blue particles 92 are released into the bearing 1, giving a dominant green color.

An operator can then note the color change and also the fact that the threshold values of both parameters have been exceeded.

Similar examples can be described for a single parameter but with shells 91 sensitive to different threshold values, said shells each enclosing particles 92 of different color.

In case of multiple parameters and/or threshold values, the identification may be analyzed with a previously established color chart.

Similar examples can be described for microcapsules 9 containing particles 92 consisting of chemical reactive agents; identification can thus be made using a composition grid previously established by calibration.

The technical features of the embodiments and variations discussed above may be combined.

The invention claimed is:

1. A mechanical system comprising:
   at least one moving component,
   a lubricant, and
   microcapsules, the microcapsules each consisting of particles encased within a shell which, under the effect of a variation of a given characteristic physical parameter of the mechanical system, is capable of releasing the particles, the dispersion of which is identifiable by a monitoring system located external to the mechanical system,
   wherein the mechanical system comprises a plurality of microcapsule types, each type of microcapsule being sensitive to the variation of a different physical parameter that is specific to the mechanical system, thus enabling the release of particles for the variations of different parameters.

2. The mechanical system according to claim 1, wherein the at least one moving component comprises:
   a bearing having a first ring, a second ring, said first ring and said second ring being rotatably mobile relative to each other;
   at least one row of rolling elements, and
   a bearing chamber defined between the two rings and configured to have the lubricant disposed therein.

3. The mechanical system according to claim 1, wherein the microcapsules are mixed with the lubricant of the mechanical system.

4. The mechanical system according to claim 1, wherein the microcapsules are deposited as a layer on a surface of at least a part of an internal component of the mechanical system.

5. The mechanical system according to claim 1, further comprising a type of microcapsule that is sensitive to the variation of a single physical parameter of the mechanical system,
   while the microcapsules of which are each sensitive to a different threshold value of said single physical parameter,
   thus enabling the particles to be released at different threshold values of the single physical parameter of the mechanical system.

6. The mechanical system according to claim 1, wherein the shells of the microcapsules are sensitive to at least one of different parameters and different threshold values.

7. The mechanical system according to claim 6, wherein each microcapsule includes particles of different types.

8. The mechanical system according to claim 1, wherein the particles of the microcapsules are electrically charged.

9. The mechanical system according to claim 1, wherein the particles of the microcapsules are chemical reagents capable of reacting with one of the components of the mechanical system.

10. The mechanical system according to claim 1, wherein the particles of the microcapsules are coloring agents.

\* \* \* \* \*